US008560952B2

(12) United States Patent
Collins et al.

(10) Patent No.: US 8,560,952 B2
(45) Date of Patent: Oct. 15, 2013

(54) ADDING AN ARBITRARY NUMBER OF PLACEHOLDERS TO A CUSTOM LAYOUT

(75) Inventors: Nathalie S. Collins, Sunnyvale, CA (US); Hoa N. Lu, Oakland, CA (US); Dennis Coh, Sunnyvale, CA (US); Andy Chin, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1345 days.

(21) Appl. No.: 11/152,751

(22) Filed: Jun. 13, 2005

(65) Prior Publication Data

US 2006/0282759 A1    Dec. 14, 2006

(51) Int. Cl.
*G06F 17/24* (2006.01)
*G06F 17/30* (2006.01)

(52) U.S. Cl.
USPC ........... 715/730; 715/234; 715/241; 715/243; 715/246; 715/256; 715/731; 715/732

(58) Field of Classification Search
USPC ......... 715/234, 241, 243, 246, 256, 730, 731, 715/732
See application file for complete search history.

(56) References Cited

U.S. PATENT DOCUMENTS

| | | | |
|---|---|---|---|
| 5,555,369 A * | 9/1996 | Menendez et al. | 715/762 |
| 6,636,888 B1 * | 10/2003 | Bookspan et al. | 709/203 |
| 6,850,808 B2 * | 2/2005 | Yuen et al. | 700/86 |
| 2002/0161603 A1 * | 10/2002 | Gonzales | 705/1 |
| 2003/0014442 A1 * | 1/2003 | Shiigi et al. | 707/513 |
| 2004/0268299 A1 * | 12/2004 | Lei et al. | 717/106 |
| 2006/0225037 A1 * | 10/2006 | Glein et al. | 717/117 |

OTHER PUBLICATIONS

Geetesh Bajaj, "Create a Power Point Template", publisher: Computer Companion, published: Aug. 2004, pp. 1-6.*
Bardzell et al, "Macromedia Studio MX 2004: Training from the source", published: Feb. 9, 2004, publisher: macromedia press, pp. 1-7, 1B-6B, 1C-6C, 1D-8D.*
Siebel, "Web template explorer", published: Oct. 20, 2003, p. 1.*

* cited by examiner

*Primary Examiner* — Stephen Hong
*Assistant Examiner* — Wilson Tsui
(74) *Attorney, Agent, or Firm* — Merchant & Gould

(57) ABSTRACT

A custom layout may be created that includes an arbitrary number of placeholders. Instead of having to use one of the predefined slide layouts available from a presentation program, a user may create their own set of custom layouts that may be used in zero or more presentations and applied to zero or more slides. A custom layout may include title placeholders, header/footer placeholders, as well as body placeholders. The custom layouts may contain both typed and un-typed placeholders. The placeholders on the custom layout may be positioned and formatted as desired by the user. A user may also create and include customized backgrounds on the custom layout. The custom layout may be edited in the same manner as a slide. The user may utilize the interface to copy, move, delete, and edit the custom layouts.

20 Claims, 8 Drawing Sheets

ADDING AN ARBITRARY NUMBER OF PLACEHOLDERS TO A CUSTOM LAYOUT

BACKGROUND

Many individuals and businesses prepare and deliver presentations using a computer presentation program. Typically, presentation programs provide a user with a graphical user interface that allows the user to edit, create, and present slides. A user may be presented with a blank slide with predefined placeholders. The placeholders may store many different types of content, such as text, lists, pictures, tables, charts, and the like. The user may modify each of the slides by adding content to the placeholders or may adjust some formatting settings within the presentation. For example, a user may be able to adjust: placeholder text styles, placeholder size and positioning, backgrounds, color schemes, animations, and the like. Manually arranging content on each slide is very time consuming and leads to inconsistencies between slides.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one aspect of the invention, a custom layout may be created that includes an arbitrary number of placeholders. Instead of having to use one of the predefined slide layouts available from a presentation program, a user may create their own set of custom layouts that may be used in zero or more presentations and applied to zero or more slides.

For example, a custom layout may include title placeholders, header/footer placeholders, as well as body placeholders. The placeholders may be any type of placeholder, including, but not limited too: generic placeholders; text placeholders; table placeholders; chart placeholders; diagram placeholders; media clip placeholders; clip art placeholders and the like. The custom layouts may contain both typed and un-typed placeholders.

According to another aspect of the invention, the placeholders on the custom layout may be positioned and formatted as desired by the user. A user may also create and include customized backgrounds on the custom layout.

According to yet another aspect of the invention, the custom layout is contained within a hierarchy. Any property that is not specifically defined in the custom layout may be inherited from its parent(s) depending on the hierarchy associated with the presentation program slides.

According to still yet another aspect of the invention, a graphical user interface may be used in creating and editing the custom layout. In one example, a thumbnail view shows the hierarchical relationship between slide masters and layouts used within the presentation. The custom layout may be edited in the same manner as a slide. The user may utilize the interface to copy, move, delete, and edit the custom layouts. For example, the user may select and move a body placeholder on a custom layout by clicking on it and dragging the selected placeholder to its desired position on the custom layout.

DETAILED DESCRIPTION

Generally, embodiments of the present invention are related to creating a custom layout that includes an arbitrary number of placeholders. Instead of having to use one of the predefined slide layouts available from a presentation program, a user may create their own set of custom layouts that may be used in zero or more presentations and applied to zero or more slides. For example, a custom layout may include title placeholders, header/footer placeholders, as well as body placeholders. The placeholders may be any type of placeholder, including, but not limited too: text placeholders; table placeholders; chart placeholders; diagram placeholders; media clip placeholders; clip art placeholders and the like. The custom layouts may contain both typed and un-typed placeholders. The placeholders on the custom layout may be positioned and formatted as desired by the user. A user may also create and include customized backgrounds on the custom layout. According to one embodiment, the custom layout is contained within a hierarchy. Any property that is not specifically defined in the custom layout may be inherited from its parent(s) depending on the hierarchy associated with the presentation program slides. A graphical user interface may be used in creating and editing the custom layout. The custom layout may be edited in the same manner as a slide. The user may utilize the interface to copy, move, delete, and edit the custom layouts. For example, the user may select and move a body placeholder on a custom layout by clicking on it and dragging the selected placeholder to its desired position on the custom layout.

Figure 2:
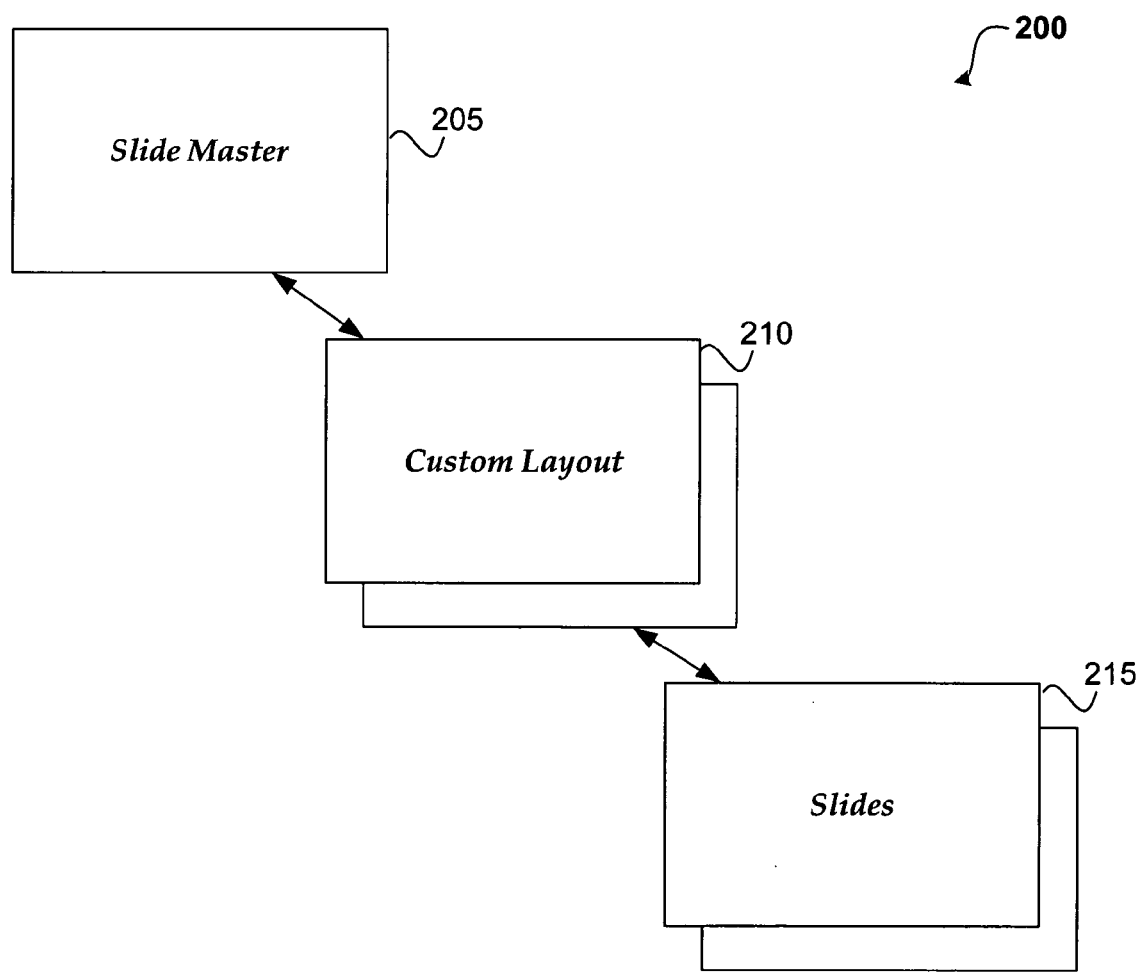
FIG. 2 shows a general overview of a hierarchical structure between slide masters, layouts, and slides.

FIG. 2 shows a general overview of a hierarchical structure between slide masters, custom layouts and slides, in accordance with aspects of the present invention. Three hierarchical layers are illustrated within system 200 including slide master 205, custom layout 210, and slide(s) 215 and 220. Although illustrated as three levels, the hierarchical structure may be any number of levels.

A design defines the overall appearance of a presentation. There can be one or more designs used in a single presentation. A design may consist of one or more slide masters; zero or more layouts; and zero or more slides. Each slide master in a design includes "theme" information that is used to describe the look and feel of the presentation. Each slide master represents a design and is the container for many of the global settings in a presentation including: placeholder text styles, placeholder size and positioning for layouts, background, color scheme, and animation.

Each presentation includes at least one slide master (205) and each slide master may include zero or more custom layouts that may be associated with zero or more slides (215 and 220). Slide master 205 is at the highest level within the hierarchy. Custom layouts 210 are located at the second level within the hierarchy and the slides (215 and 220) are at the third level within the hierarchy. Slides 215 and 220, therefore, inherit their corresponding properties from the parent layout and the layouts inherit properties from its parent slide master. Changes made to the slide master propagate to the layout level and then propagate to the slide level. Changes made at the layout level propagate down to the associated slides. An exception can be made to a property at one or more of the hierarchical levels that overrides the inheritance of that property from parent layers.

Slide master 205 helps to enable presentation authors to create an overall look and feel for a presentation. One or more slide masters may be used within a presentation. The slide master determines the styles and background for the presentation. The slide master may also include the title properties directly within the slide master. Slide masters also store the global placeholder and text style definition that is the default for a layout's position and size of: title placeholders; header, footer and slide placeholders; and logo placeholders.

One or more layouts are used to define properties, such as the geometries, associated with slides 215 and 220. Presentation authors can also create custom layouts having an arbitrary number of placeholders that can be used by one or more of the slides. Any custom layouts that are created may also be included within other presentations and the custom layouts may be associated with zero or more slides within those presentations. The custom layouts assist the presentation designer in implementing their own design criteria.

According to one embodiment, a default list of predefined layouts is provided with a slide master. For example, when a user adds a new slide master to a presentation, a set of predefined layouts may also be added to the presentation as children of the newly added slide master. These predefined layouts include a predefined number of placeholders and may represent many different layouts. These predefined layouts may be modified by the presentation author and then saved, thereby creating a custom layout.

Slides point to layouts for their placeholder and slide-level properties. Generally, layouts (both predefined and custom) derive the default position of their title, date/time, footer, and slide number placeholders from their counterparts on the master. For each of these placeholders, if no size or position changes have been made on the layout, then their position/size is inherited from the master. Each layout may include its own number and arrangement of body placeholders that share the global style definition from the slide master by default, but may also store unique size and position information for each layout.

The presentation author is given the ability to not only specify an overall look for a presentation, but also to customize the layouts available to the slide master.

Figure 3:
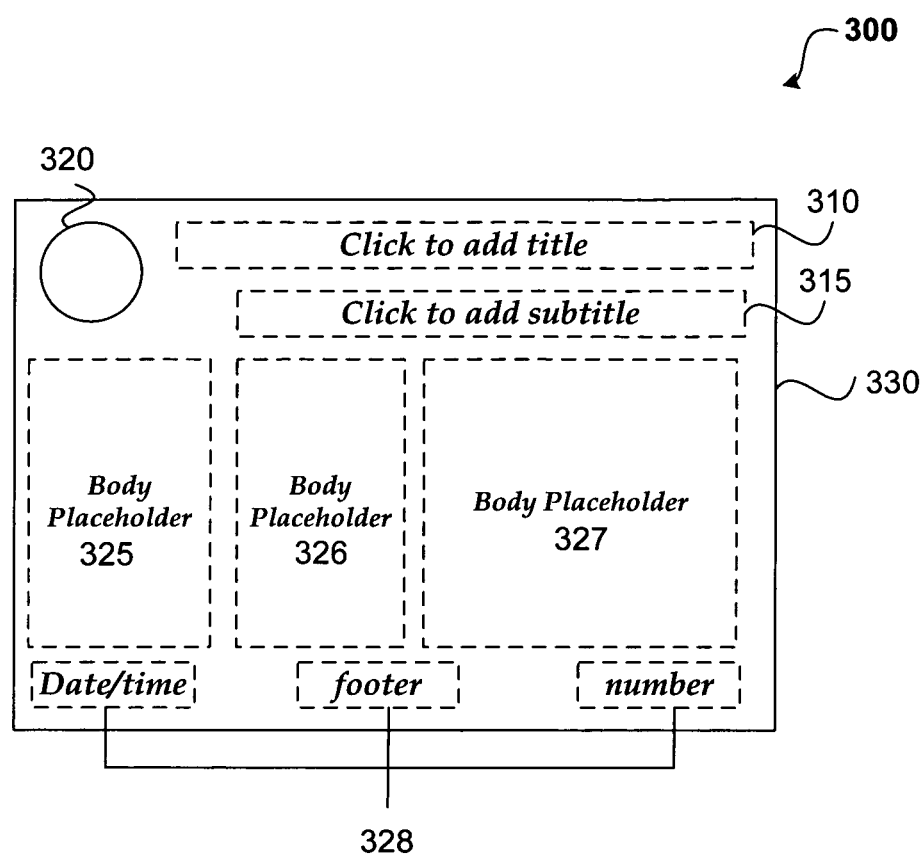
FIG. 3 illustrates exemplary components of a custom layout.

FIG. 3 illustrates exemplary components of a custom layout, in accordance with aspects of the invention. According to one embodiment, custom layouts are presented to the designer as a slide. Presenting the custom layout as a slide is directed at providing an easy way to visualize and modify custom layouts. Custom layouts may contain both typed and un-typed placeholders, as well as formatting options, custom backgrounds and the like. According to one embodiment, any property that is not specifically defined within the custom layout is inherited from the master slide with which it is associated.

The primary building block of custom layouts is placeholders. A layout can contain a title placeholder, footer placeholders and body placeholders. As illustrated in custom layout 330, the placeholders include a title placeholder (310), a subtitle placeholder (315), three body placeholders (325, 326, and 327) and three footer placeholders (328).

The user designing or editing the placeholder may add as many placeholders to the custom layout as desired. The maximum number of placeholders in a layout is only limited by the presentation program.

Each layout may contain a title placeholder, such as title placeholder 310. If a title placeholder is included within the custom layout, its name, location, size, and text/object formatting may also be defined. According to one embodiment, each new custom layout that is instantiated contains a title placeholder. The title placeholder is located in the same position as the title placeholder on the master slide and inherits its text/formatting properties from the master's title placeholder at the slide master level. These properties may be modified by the user at the custom layout level. For example, the user may decide to resize and move the title placeholder. Any properties modified at the custom layout level override the properties at the slide master level.

A layout may contain zero or more body placeholders. Generally, a body placeholder is a placeholder that is used to store content. There are many different types of placeholders, including, but not limited too: generic placeholders; text placeholders; table placeholders; chart placeholders; diagram placeholders; media clip placeholders; clip art placeholders and the like.

According to one embodiment of the invention, a newly created custom layout does not initially contain any body placeholders. According to another embodiment, a predefined number of body placeholders may be included on a newly created custom layout. For example, the custom layout may initially include two un-typed placeholders.

The header and footer placeholders (328) provide a date/time; footer; and number placeholder by default. According to one embodiment, the three footer placeholders are instantiated on the custom layout in the same location as those on the master.

According to one embodiment, when a new layout is created, it is instantiated with four default placeholders: a title placeholder (310) and the footer placeholders (328) that include a date/time placeholder, a footer placeholder, and a slide number placeholder. The placeholders inherit their formatting and style properties from the master. The default location for the placeholders is the same as that of the placeholder's counterparts on the main master.

The user may also modify formatting properties associated with the placeholders. For example, the user may modify backgrounds, formatting of the text, and the like.

Figure 4:
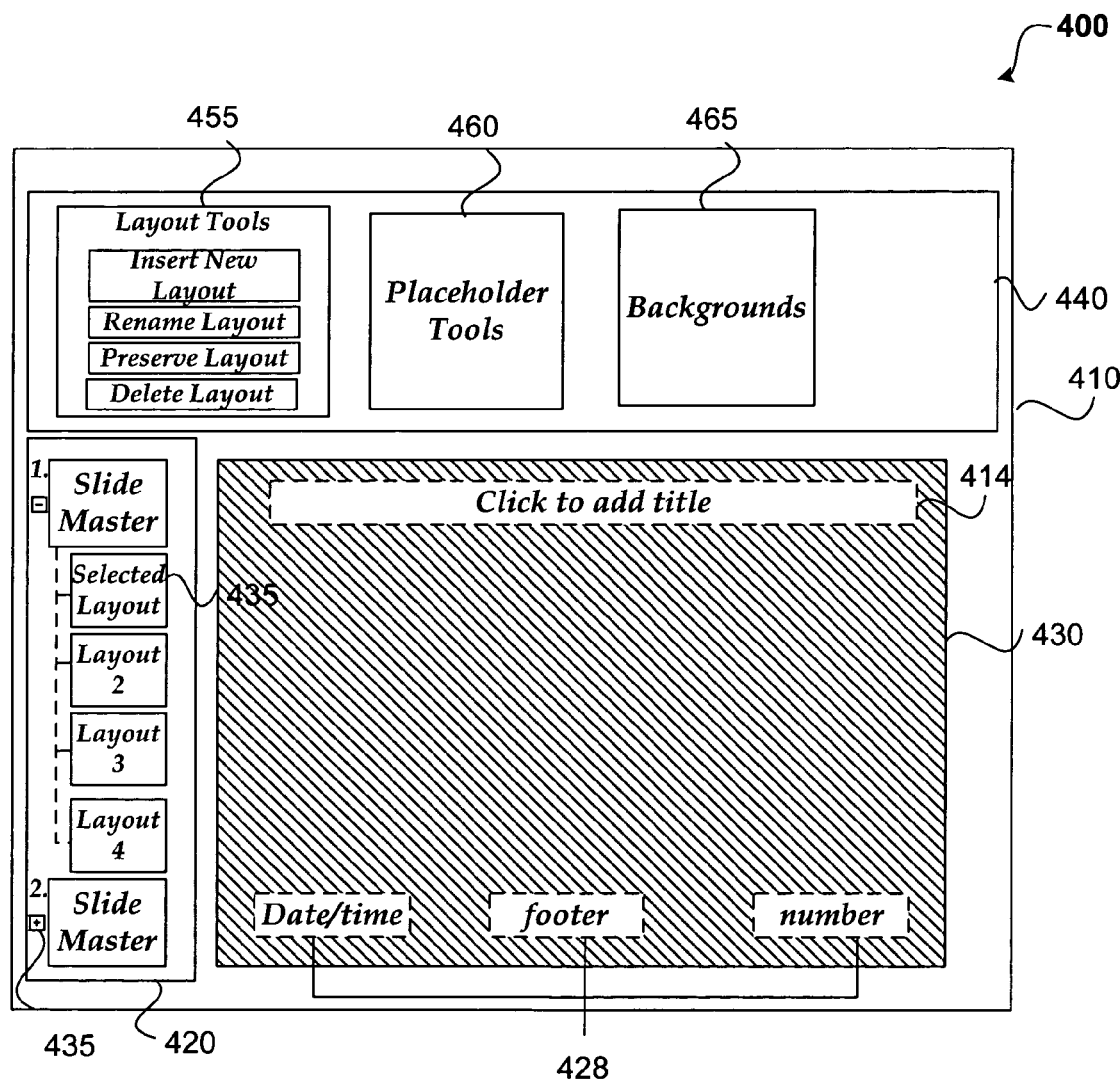
FIG. 4 shows a graphical user interface that may be used to configure custom layouts.

FIG. 4 shows a graphical user interface that may be used to configure custom layouts, in accordance with aspects of the present invention. The user interface is directed at maintaining visual and behavior differentiation between the slide master and the layouts as a place to set global settings (vs. layout-specific settings) as well as to provide appropriate visual feedback to the user when they make changes to a custom layout.

Master view 410 includes thumbnail view 420. Each slide master is represented with a thumbnail and the layouts are represented with smaller thumbnails underneath the slide master. The hierarchical relationship between the slide masters and their associated layouts may clearly be seen in thumbnail view 420. Each slide master is the parent of an ordered list of layouts and each layout may or may not be associated with a set of slides. According to one embodiment, slide masters and layout thumbnails are rendered in the same view. The user may quickly distinguish which set of layouts correspond to which slide master since the layouts are shown with their associated slide master. Referring to master view 410, it can be easily seen that four layouts are associated with slide master 1. These layouts may be custom layouts and/or predefined layouts. The layouts may be hidden from view by collapsing them using an expand/collapse user interface element, such as expand/collapse user interface element 435. According to another embodiment, the slides associated with the layouts may also be shown in the thumbnail view. For example, the slides may be shown indented from their associated layout.

The user may interact with the thumbnails displayed in the thumbnail view. Generally, the user may select one or more thumbnails and perform some operation on the selected thumbnails. Selecting a single slide master or layout thumbnail causes the presentation program to preview the full slide master or layout, respectively, in the main canvas view (430). As illustrated, canvas view 430 shows the full layout view of selected layout 435. In this particular example, selected layout 435 is a custom layout that has not yet been modified.

A portion of the user interface (440) is used to show commands that are used to interact with the masters, layouts, and slides. Layout tools 455 show some commands that may be used with layouts. Placeholder tools 460 include different placeholders that may be included on the custom layout. Backgrounds 465 include different backgrounds that may be associated with the custom layout.

The insert new layout command in the layout tools (455) inserts a new layout below the currently selected slide master and displays the new layout in the thumbnail list 420. When a new layout is created a unique name is assigned and the newly added layout is locked by default. Locking the layout marks a flag such that the layout is not deleted from the presentation even when there are no slides that depend on it.

A duplicate layout may also be inserted underneath a slide master. The duplicate layout is a copy of a layout already in a presentation. According to one embodiment, different layouts having a different slide master as a parent may have the same name.

Layouts may be deleted using the delete layout command in layout tools 455. Renaming a layout changes the display name and metadata name of the selected layout. Preserving a layout sets the "lock" so that the layout remains in the presentation even when no slides depend on it. When a layout has already been locked, selecting the preserve layout option will unlock the layout. According to one embodiment, preserving a layout shows a push-pin icon next to that layout's thumbnail within thumbnail view 320.

A user may also copy and paste layout(s) or slides using the systems copy and paste functions. For example, in Microsoft Windows® using the CTRL-C command on a selected layout copies the selected layout to the clipboard. Using the CTRL-V command pastes the layout on the clipboard below the current selection.

An example will now be described to help illustrate creating and editing properties associated with a custom layout.

The general process for creating a custom layout includes selecting the insert new layout command in layout tools 455 and then adding placeholders using placeholder tools 460, formatting properties associated with the layout, and saving the layout so that it may be accessed at a later time by this, or another, presentation.

As illustrated, according to one embodiment, the initial custom layout consists of the footer placeholders (428) and the title place holder (414). As discussed above, according to one embodiment, the background and any animation settings are the same as the slide master that is associated with the layout's slide. In this example, the background of the custom layout is set to a diagonal hashing as set within the slide master that is associated with the custom layout. Any of these placeholders, and/or properties associated with the custom layout may be changed or deleted by the user. Should any of the title or footer placeholders be deleted from the layout, they may be added at another time to the layout. Should the default placeholders be re-added to the custom layout they will inherit their properties from the associated slide master.

Figure 5:
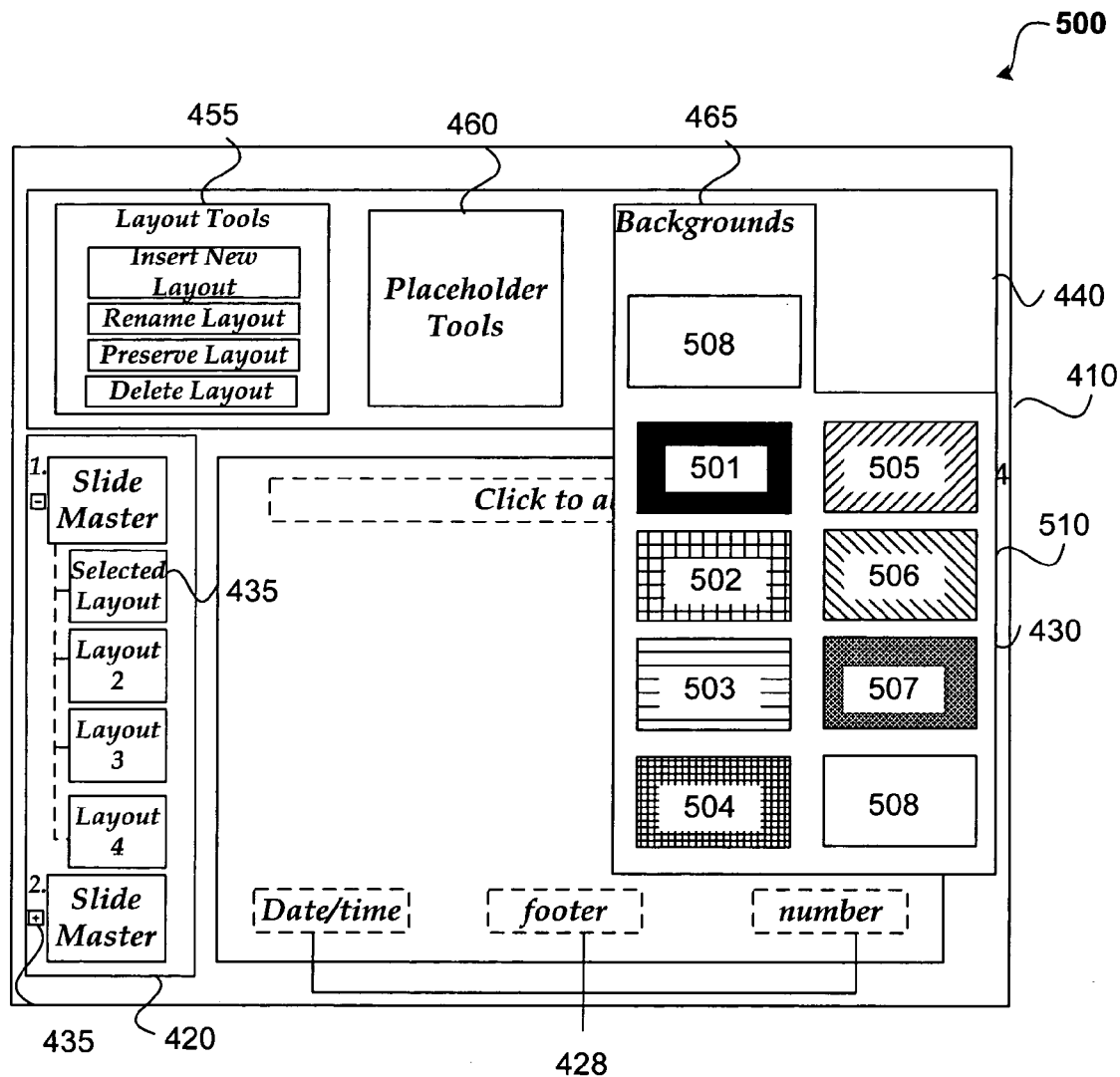
FIG. 5 illustrates changing the background of a custom layout.

FIG. 5 illustrates changing the background of a custom layout, in accordance with aspects of the invention. In this example, the user would like to change the background that is associated with this custom layout.

Backgrounds 465 may be used to select a different background fill for the layout. For example, the user may change the background color or fill by selecting one of the available backgrounds (501-508) from background list 510. In this example, the user has selected the white background (508) and has applied it to the custom layout. While only eight backgrounds have been shown, the number of backgrounds is not limited. Additionally, the background for the custom layout may be set using many different methods. For example, the user could enter the name of the background in an input box; the user could drag and drop a background object from another master, layout, or slide, and the like. Any slides that depend from the custom layout will include the white background unless that slide makes an exception to the background.

Figure 6:
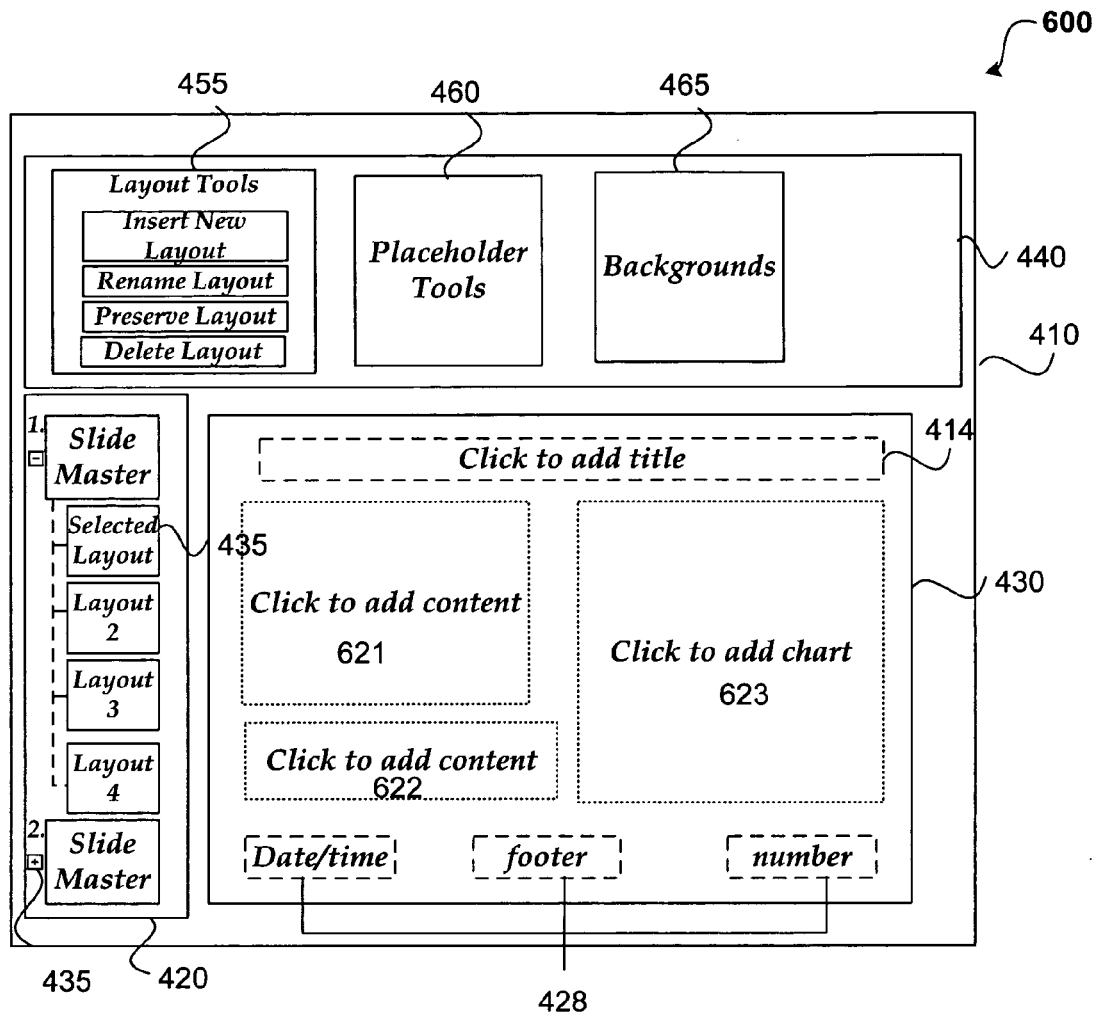
FIG. 6 shows adding body placeholders to a custom layout.
Figure 6:
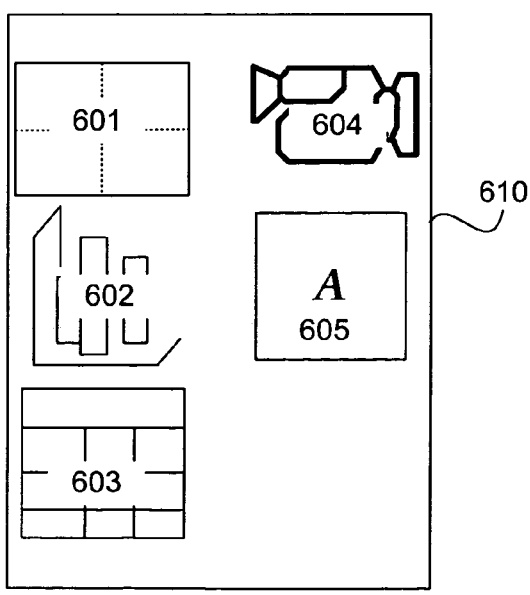

FIG. 6 shows adding body placeholders to a custom layout, in accordance with aspects of the invention. According to one embodiment, a user may add and position as many placeholders as they would like onto a custom layout.

Generally, to add a placeholder to the custom layout, the user selects the type of placeholder they want to insert from the placeholder gallery (610) and then draws it onto the layout. The placeholder gallery 610 is shown to the user in response to selecting placeholder tools 460. The placeholder may be selected from any available type of text placeholder, including, but not limited to: table placeholders; chart placeholders; diagram placeholders; media clip placeholders; clip art placeholders and the like. The custom layouts may contain both typed and un-typed placeholders.

For example, placeholders 621 and 622 are generic un-typed placeholders that may be used to store any type of content. To add these placeholders, the user selects placeholder 601 from placeholder gallery 610 and then selects the starting point of the placeholder on slide 430 and sizes the placeholder by dragging the bottom right corner of the placeholder to the desired ending position. The placeholders may be inserted using many different methods. For example, when a placeholder is initially inserted it could be sized and positioned by default within the custom layout. The placeholder could also be positioned at a default location within the custom layout and then moved and resized according to the requirements of the user. Placeholder 623 is a chart placeholder that has been added to the custom layout by the user. In order to add the chart placeholder to the custom layout, the user selects the chart placeholder type (602) from menu 610 and then draws the chart onto the custom layout. Any other placeholders may be added to the custom layout using a similar method.

Any placeholders that are shown on the custom layout may be modified by the user. For example, the user may resize the placeholders, reposition the placeholders, change the type of placeholders, and adjust any properties associated with the placeholders. The user may desire to change the font, adjust the size of text, change a background color for a placeholder, and the like. According to one embodiment, any property that is associated with a placeholder may be set through the user interface. Any slides created that are based on this custom layout will initially have the same properties and placeholders as this custom layout. Should a user desire to change a property on the slide itself, then an exception will be created and that property will not be inherited from the custom layout. Once saved, this custom layout may be used in other presentations and/or placed under another slide master within the same presentation.

Figure 7:
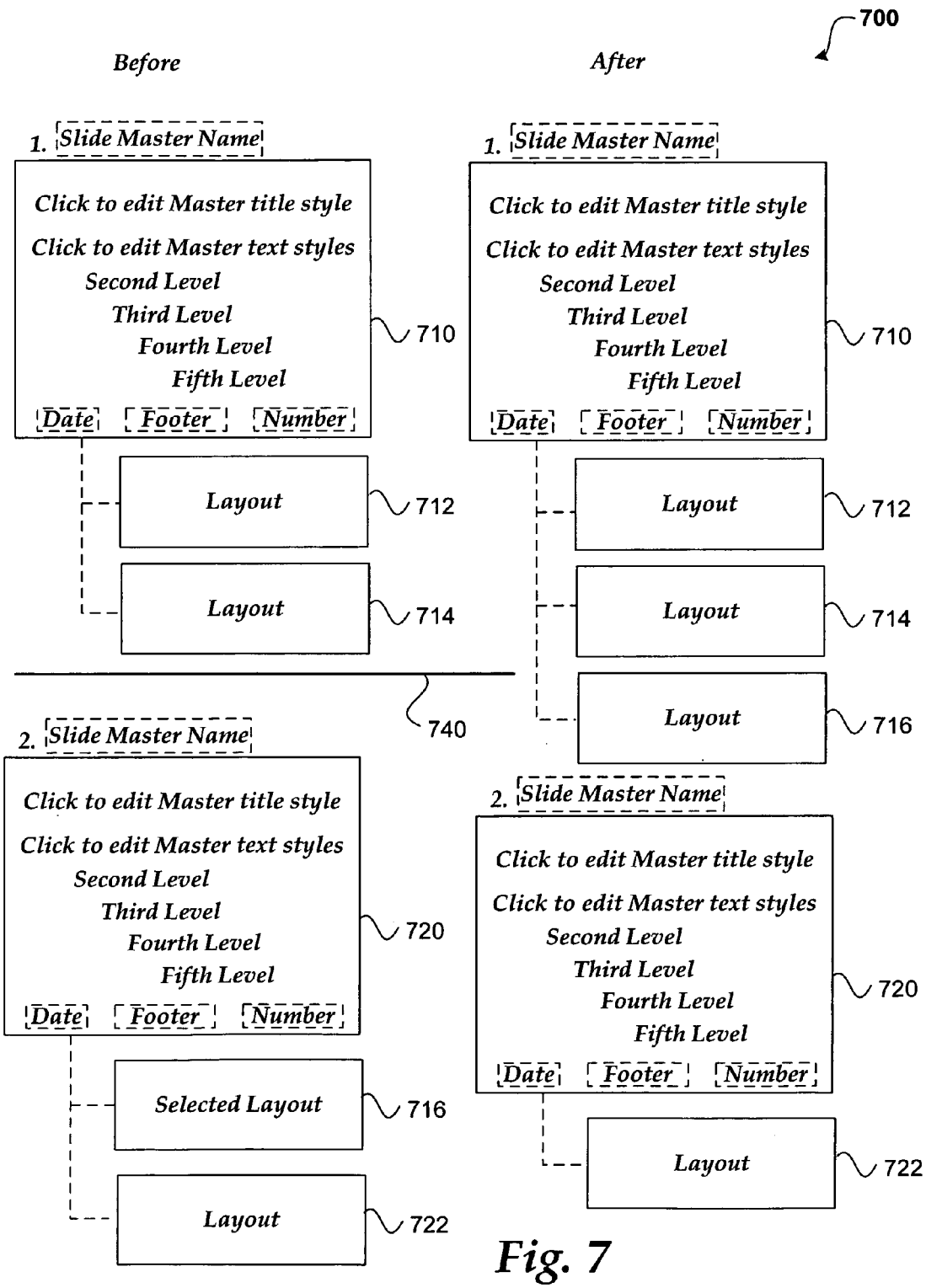
FIG. 7 illustrates dragging and dropping a layout.

FIG. 7 illustrates dragging and dropping a layout, in accordance with aspects of the present invention. A user may select and drag and drop layouts within the user interface. As illustrated within FIG. 7, a before hierarchical view is shown that includes two slide masters (710 and 720) and four layouts (712, 714 and 716 and 722). Two layouts (712 and 714) are children of slide master 710, and two layouts (716 and 722) are a child of slide master (720). FIG. 7 also illustrates an after hierarchical view that includes two slide masters (710 and 720) and four layouts (712, 714, 716 and 722). Three layouts (712, 714 and 716) are children of slide master 710, and one layout (722) is a child of slide master (720).

For purposes of this example, the user has selected layout (716) and desires to reposition the layout to the position within the hierarchy represented by line (740). Line 740 illustrates the drop target for the selected layout (716). Once the user releases the selection, the layout (716) is placed according to the release point. According to one embodiment, a drag/drop operation is by default a move operation. Holding the CTRL key during the drag/drop operation performs a copy.

For layouts that are dragged to a different slide master, the slides that were associated with the moved layout remain children of the layout under the new slide master.

Layouts may be dragged underneath a slide master or between other layouts. In the case where a layout is dragged between a layout and a slide master, the layout is dropped under the parent-slide master of the layout. For layouts that are copied to a different slide master, the layouts are copied to the slide master and the slides that used them remain pointing to the original version of the layouts under the original slide master. If the layouts are copied/moved then it is considered a move and the behavior is the same as a drag and drop operation.

When more than one layout is selected, then the layouts are pasted in the order they appeared in the selection when they were copied (front to back).

Figure 8:
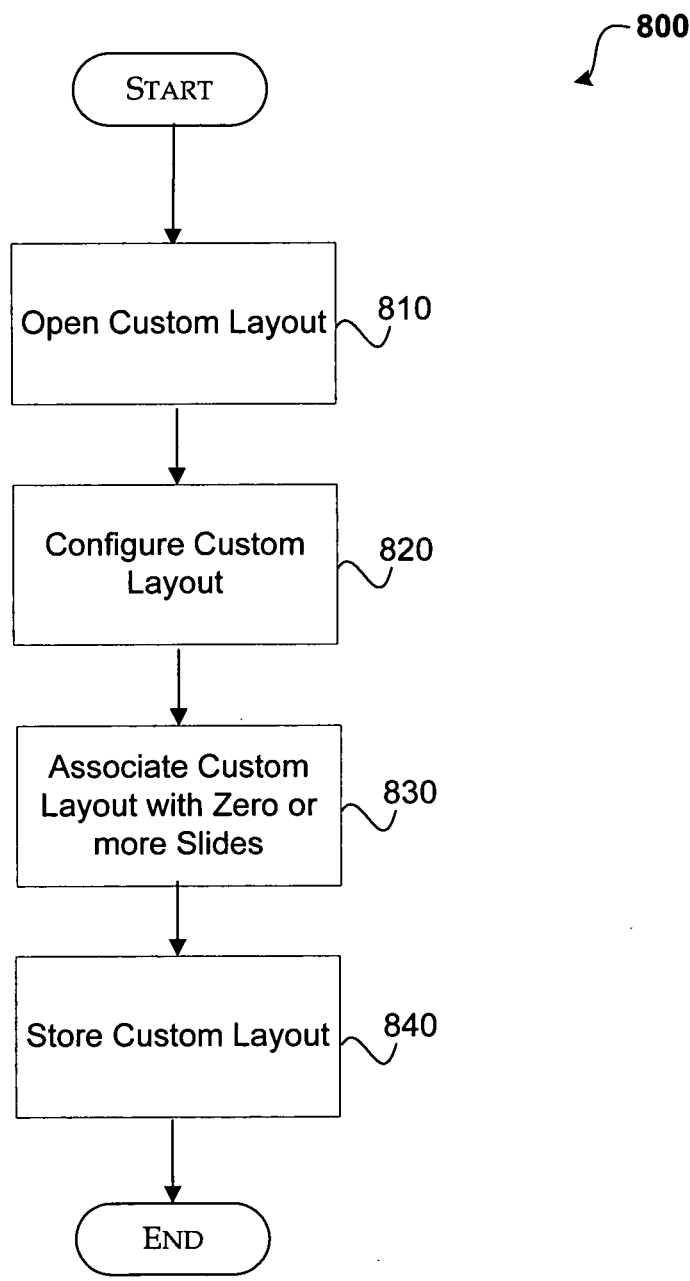
FIG. 8 shows a process for configuring a custom layout, in accordance with aspects of the present invention.

FIG. 8 shows a process for configuring a custom layout, in accordance with aspects of the present invention.

After a start block, the process flows to block 810 where a custom layout is opened by a user. The custom layout that is opened may be a new custom layout that is created or may be a custom layout that has already been created.

Moving to block 820, the custom layout is configured. Any property may be modified that is associated with the custom layout. For example, placeholders may be inserted, deleted, and/or modified on the custom layout. According to one embodiment, the custom layout is presented to the user as a slide within a graphical user interface that may be used in modifying the placeholders on the custom layout.

Transitioning to block 830, the custom layout is associated with zero or more slides. According to one embodiment, the custom layout is at a higher level within a hierarchy such that properties at the custom layout level are inherited by the slides that depend upon the custom layout. The custom layout may be associated with one or more presentations and one or more slide masters.

Moving to block 840, the custom layout is stored within a store, such that it may be accessed at a later time by one or more presentations.

The process then moves to an end block and returns to processing other actions.

Illustrative Operating Environment

Figure 1:
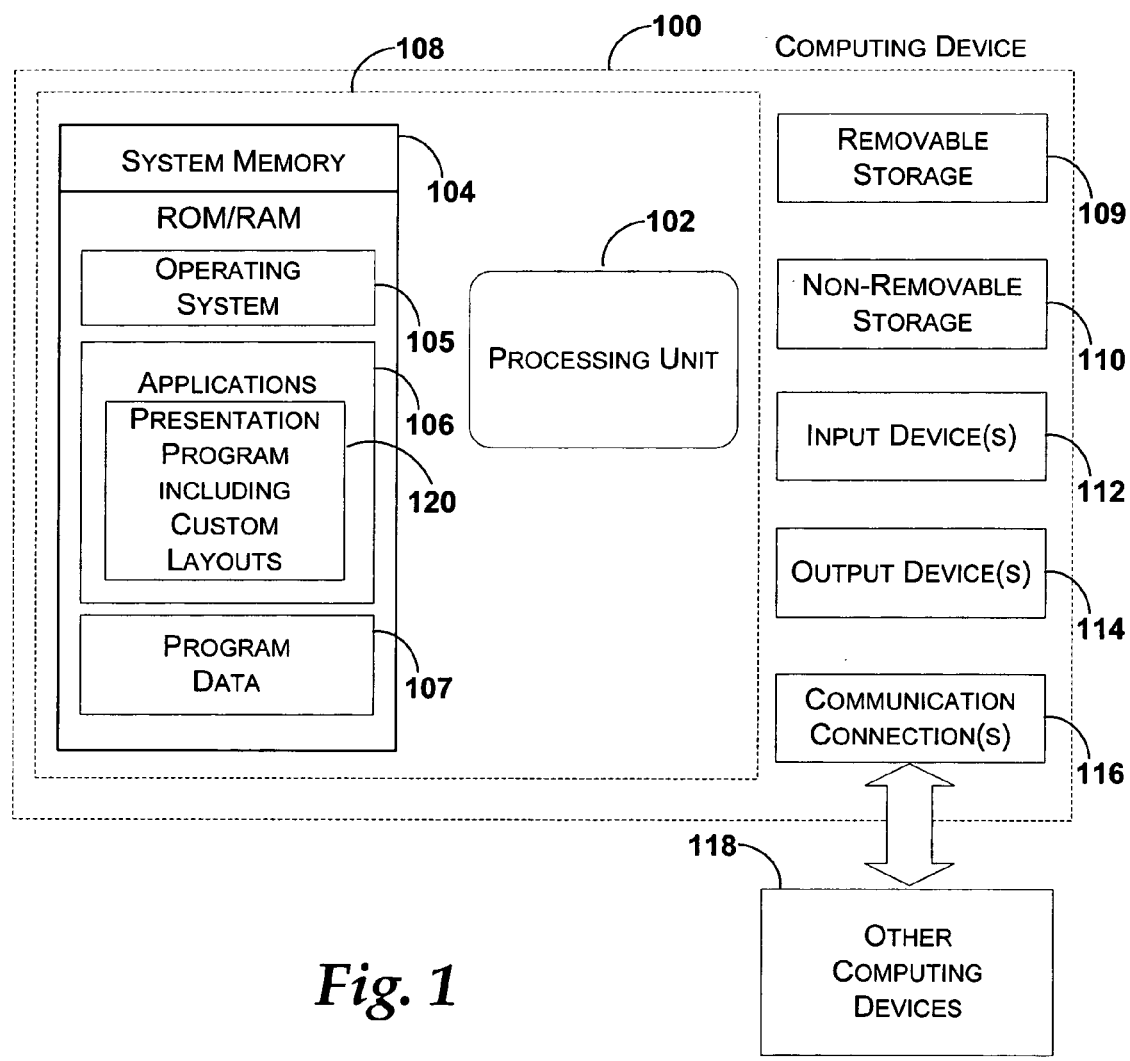
FIG. 1 illustrates an exemplary computing device that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a presentation program 120 that includes custom layouts that may be created and modified by a user and then used within presentations. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification, examples and data provide a complete description of the manufacture and use of the composition of the invention. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for configuring a custom layout for a presentation of slides, comprising:

opening and displaying a custom layout that includes placeholders within a graphical user interface that comprises: a master view that includes a canvas view that displays a layout view of a selected layout within a first portion of the master view; a thumbnail view that displays a relationship between slide masters and their associated layouts within a second portion of the master view, wherein the thumbnail view displays thumbnails for each slide master and beneath the display of each slide master, the associated layouts for the slide master, wherein selection of one of the slide masters or one of the associated layouts displays a preview of the selection within the canvas view; a command view in a third portion of the master view that displays layout tools including displayed options for inserting a new layout, deleting a layout, and renaming a layout, placeholder tools that include options for adding and displaying one or more placeholders within the canvas view and backgrounds that include different backgrounds to associate with the custom layout, wherein the placeholders are selected from placeholders comprising a typed placeholder; an un-typed placeholder; a table placeholder; a chart placeholder; a diagram placeholder; a media clip placeholder; and a clip art placeholder;

configuring properties associated with the custom layout;

placing the custom layout into a hierarchy for the presentation; wherein the custom layout is placed at a same level within the hierarchy as a second layout within the presentation of slides;

wherein the second layout is associated with a slide master within the hierarchy; wherein the hierarchy presentation for the slides includes the slide master, a second slide master, at least two layouts; and at least two slides; wherein the second slide master is at a same hierarchical level as the slide master within the presentation and wherein the second slide master is configured to be associated with one or more custom layouts for the presentation, wherein the one or more custom layouts inherits from the second slide master;

associating the custom layout with the slide master that resides at a higher level in the hierarchy as compared to the hierarchical level of the custom layout; wherein the slide master includes defined properties for each placeholder included on the slide master;

associating the custom layout with one or more slides in the presentation of the slides that is not already associated with the second layout; wherein the slides reside at a lower level in the hierarchy as compared to the hierarchical level of the custom layout and the second layout and wherein the custom layout may be included in other presentations; and storing the custom layout such that it may be accessed by the presentations.

2. The method of claim 1, wherein configuring the properties associated with the custom layout comprises performing at least one of the following actions: inserting a placeholder; deleting a placeholder; and modifying a property associated with a placeholder.

3. The method of claim 2, wherein the placeholders in the custom layout include at least one of: a typed placeholder; an un-typed placeholder; a table placeholder; a chart placeholder; a diagram placeholder; a media clip placeholder; and a clip art placeholders.

4. The method of claim 1, further comprising representing the custom layout as a slide within the graphical user interface.

5. The method of claim 4, further comprising placing the custom layout into the hierarchy such that any slides that depend on the custom layout are direct children of the custom layout.

6. The method of claim 4, wherein the configurations made to the placeholders are shown to the user within a view of the graphical user interface.

7. The method of claim 5, further comprising associating the custom layout with one or more slide masters that reside at a higher level in the hierarchy as compared to hierarchical level of the custom layout.

8. The method of claim 4, further comprising displaying at least two levels of the hierarchy within the user interface such that the hierarchical relationship between the at least two levels is illustrated within the display.

9. A computer-readable storage medium excluding a signal having computer executable instructions for configuring a custom layout, comprising:

configuring properties for a custom layout using a graphical user interface that comprises: a master view that includes a canvas view that displays a layout view of a selected layout within a first portion of the master view; a thumbnail view that displays a relationship between slide masters and their associated layouts within a second portion of the master view, wherein the thumbnail view displays thumbnails for each slide master and beneath the display of each slide master, the associated layouts for the slide master, wherein selection of one of the slide masters or one of the associated layouts displays a preview of the selection within the canvas view; a command view in a third portion of the master view that displays layout tools including displayed options for inserting a new layout, deleting a layout, and renaming a layout, placeholder tools that include options for adding and displaying one or more placeholders within the canvas view and backgrounds that include different backgrounds to associate with the custom layout, wherein the placeholders are selected from placeholders comprising a typed placeholder; an un-typed placeholder; a table placeholder; a chart placeholder; a diagram placeholder; a media clip placeholder; and a clip art placeholder;

associating the custom layout with one or more slides within a presentation; wherein at least one of the other slides within the presentation is associated with a second layout; and wherein the custom layout and the second layout are placed into a hierarchy at a same hierarchical level that is higher than a hierarchical level of the slides; wherein the custom layout and the second layout inherits properties for each placeholder included on a slide master at a hierarchical level higher than the custom layout unless specifically overridden; wherein at least one of the slides within the presentation are associated with a second slide master for the presentation that includes the slide master that is at a same hierarchical level as the slide master and wherein the second slide master is configured to be associated with one or more custom layouts, wherein the one or more custom layouts inherits from the second slide master; and storing the custom layout such that it may be utilized by more than one presentation.

10. The computer-readable storage medium of claim 9, wherein configuring the properties comprises performing at least one of the following actions: inserting a placeholder on the custom layout; deleting a placeholder on the custom layout; and modifying a property associated with at least one of the placeholders positioned on the custom layout.

11. The computer-readable storage medium of claim 10, wherein inserting the placeholder on the custom layout includes selecting the placeholder from at least one of the following: a typed placeholder; an un-typed placeholder; a table placeholder; a chart placeholder; a diagram placeholder; a media clip placeholder; and a clip art placeholders.

12. The computer-readable storage medium of claim 10, further comprising displaying the custom layout as a slide within the graphical user interface, wherein the graphical user interface may be used to configure the properties for the custom layout.

13. The computer-readable storage medium of claim 12, further comprising placing the custom layout within the hierarchy such that the custom layout may have one or more slide masters as a parent.

14. The computer-readable storage medium of claim 12, wherein any configurations made to the properties are displayed within the graphical user interface.

15. The computer-readable storage medium of claim 14, further comprising copying the custom layout and associating the custom layout with zero or more slides within another presentation.

16. The computer-readable storage medium of claim 12, further comprising displaying at least two levels of the hierarchy within the graphical user interface.

17. An apparatus for configuring a custom layout, comprising:
a processor and a computer-readable storage medium configured to perform actions, comprising:
means for creating a custom layout;
means for configuring properties of placeholders that are included on the custom layout using a graphical user interface that comprises: a master view that includes a canvas view that displays a layout view of a selected layout within a first portion of the master view; a thumbnail view that displays a relationship between slide masters and their associated layouts within a second portion of the master view, wherein the thumbnail view displays thumbnails for each slide master and beneath the display of each slide master, the associated layouts for the slide master, wherein selection of one of the slide masters or one of the associated layouts displays a preview of the selection within the canvas view; a command view in a third portion of the master view that displays layout tools including displayed options for inserting a new layout, deleting a layout, and renaming a layout, placeholder tools that include options for adding and displaying one or more placeholders within the canvas view and backgrounds that include different backgrounds to associate with the custom layout, wherein the placeholders are selected from placeholders comprising a typed placeholder; an un-typed placeholder; a table placeholder; a chart placeholder; a diagram placeholder; a media clip placeholder; and a clip art placeholder view that displays a layout view of a selected layout; a thumbnail view that displays a relationship between slide masters and their associated layouts; and a command view that displays layout tools and placeholder tools that include options for adding and displaying one or more placeholders within the canvas view, wherein the placeholders are selected from placeholders comprising a typed placeholder; an un-typed placeholder; a table placeholder; a chart placeholder; and a diagram placeholder;
means for associating the custom layout with one or more slides within a presentation; wherein at least one of the other slides within the presentation is associated with a second layout; and wherein the custom layout and the second layout are placed into a hierarchy at a same hierarchical level that is higher then a hierarchical level of the slides; wherein the custom layout and the second layout inherits properties for each placeholder included on a slide master at a hierarchical level higher than the custom layout unless specifically overridden; wherein at least one of the slides within the presentation are associated with a second slide master that is at a same hierarchical level as the slide master and wherein the second slide master is configured to be associated with one or more custom layouts, wherein the one or more custom layouts inherits from the second slide master; wherein the slide master and the second slide master are included in the hierarchy for the same presentation; and
storing the custom layout such that it may be utilized by more than one presentation.

18. The apparatus of claim 17, wherein the means for configuring the properties comprises means for performing at least one of the following actions: inserting a placeholder on the custom layout; deleting a placeholder on the custom layout; and modifying properties associated with the placeholders on the custom layout.

19. The apparatus of claim 18, further comprising means for displaying the custom layout as a slide within the graphical user interface, wherein the graphical user interface may be used to configure the properties for the custom layout.

20. The apparatus of claim 18, further comprising means for providing an inheritance model such that the custom layout inherits properties from at least one slide master and is a parent to one or more slides.

* * * * *